US006999944B1

(12) United States Patent
Cook

(10) Patent No.: US 6,999,944 B1
(45) Date of Patent: Feb. 14, 2006

(54) METHOD AND APPARATUS FOR AUTHORIZING AND BILLING COMMUNICATIONS SERVICES USING A BANK CARD FINANCIAL NETWORK

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/378,018

(22) Filed: Aug. 19, 1999

(51) Int. Cl.
    *G06F 17/60* (2006.01)
(52) U.S. Cl. .............................. 705/44; 705/35; 705/39; 455/406; 379/111
(58) Field of Classification Search ................. 705/44, 705/43, 39, 14, 30, 34, 418; 455/406, 407, 455/405; 379/111, 114, 115, 123
See application file for complete search history.

(56) References Cited

U.S. PATENT DOCUMENTS

| 4,979,207 | A | * | 12/1990 | Baum et al. ................. 379/112 |
| 5,659,601 | A | * | 8/1997 | Cheslog ....................... 455/406 |
| 5,675,636 | A | * | 10/1997 | Gray ...................... 379/114.15 |
| 5,844,972 | A | * | 12/1998 | Jagadish et al. ............. 379/114 |
| 5,991,749 | A | * | 11/1999 | Morrill, Jr. ................... 705/44 |
| 6,081,791 | A | * | 6/2000 | Clark ............................ 705/43 |
| 6,141,328 | A | * | 10/2000 | Nabkel et al. ................ 370/259 |
| 6,160,874 | A | * | 12/2000 | Dickerman et al. .......... 379/114 |
| 6,167,250 | A | * | 12/2000 | Rahman et al. .............. 455/406 |
| 6,198,915 | B1 | * | 3/2001 | McGregor et al. ........... 455/406 |
| 6,201,956 | B1 | * | 3/2001 | Tehan .......................... 455/406 |
| 6,222,914 | B1 | * | 4/2001 | McMullin .................... 705/14 |
| 6,295,292 | B1 | * | 9/2001 | Voit et al. .................... 370/352 |
| 6,310,873 | B1 | * | 10/2001 | Rainis et al. ................ 370/356 |
| 6,327,578 | B1 | * | 12/2001 | Linehan ........................ 705/65 |
| 6,377,938 | B1 | * | 4/2002 | Block et al. ................... 705/32 |

* cited by examiner

*Primary Examiner*—Alain L. Bashore

(57) ABSTRACT

According to the invention, a method and apparatus are disclosed for a dynamic communications service bank card billing system for authorizing and billing communications services using a bank card financial network. The communications service bank card billing system receive events from communications services and equipment providing such services. If a received event corresponds to a request for initiating a communications service, the event is tariffed and taxed, and a pre-authorization and hold request is made to the associated customer account number. If the communications service receives a service authorization or denial indication, the communications service bank card billing system provides such indication indicative of the successful or non-successful pre-authorization and hold request. Alternatively, if a received event corresponds to a request to charge a customer account, the event is tariffed and taxed, and a forced post request is made to the associated customer account number over the bank card financial network if no pre-authorization preceded the forced post request. Otherwise, a pre-authorization completion is formatted and sent. Additionally, a representation of the content of the event is stored by the communications service bank card billing system for accumulating communications service charges during a billing period. At the end of the billing period, the communications services charges can be summarized and evaluated whether a credit or a surcharge is required. Such an account adjustment or a credit is then made via a forced post request to the associated customer bank card account number over the bank card financial network.

16 Claims, 4 Drawing Sheets

METHOD AND APPARATUS FOR AUTHORIZING AND BILLING COMMUNICATIONS SERVICES USING A BANK CARD FINANCIAL NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to communications and billing systems; and more particularly, to authorizing and billing communications services over a standard bank card financial network.

2. Description of the Prior Art

In the telephone industry today, billing communications services requires extensive post processing by large billing systems. Typically, volumes of information records are generated by communications equipment and are collected. These records are then reformatted and passed to a batch system for back office processing. These back end systems do not provide any real-time indication of whether the customer has available funds to pay for the use of the requested communications service. Moreover, provisioning of new communications services typically requires expensive and sometimes extensive modifications to these back end billing systems. Additionally, modifications to these back end billing systems cannot be performed in a timely manner for dynamically providing new communications service as demanded by customer. Therefore, a new system for authorizing and billing communications services is desired.

SUMMARY OF THE INVENTION

According to the invention, a dynamic communications service bank card billing system method and apparatus are disclosed for authorizing and billing communications services using a bank card financial network. Events from communications services and equipment providing such services are received by the communications service bank card billing system. These events can be native events generated by the equipment associated with the requested communications service, or messages communicated with the communications service bank card billing system using an agreed to protocol or message format.

If a received event corresponds to a request for initiating a communications service, the event or estimate of the event cost is tariffed and taxed, and a pre-authorization and hold request is made to the associated customer bank card account number. If the communications service receives a service authorization or denial indication, the communications service bank card billing system provides such indication indicative of the successful or non-successful pre-authorization and hold request. The pre-authorization hold transaction is followed by a completion request for the actual amount. Alternatively, if a received event corresponds to a request to charge a customer account (e.g., a message corresponding to the completion of the use of a communications service), the event is tariffed and taxed, and a forced post request is made to the associated customer bank card account number over the bank card financial network.

Additionally, a representation of the content of the event is stored by the communications service bank card billing system for accumulating communications service charges during a billing period. At the end of such a billing period, the communications services charges for a customer or customer account can be summarized and evaluated whether the customer is due a credit (e.g., a volume discount) or a surcharge is required. Such an account adjustment is then made via a forced post request or a credit to the associated customer bank card account number over the bank card financial network.

Embodiments of the present invention include computer-readable medium containing computer-executable instructions for performing a method of the present invention, and a computer system performing a method of the present invention. An embodiment of the method of the present invention provides for an interface between a financial bank card network and a communication system that provides a communication service.

An embodiment of this method can be performed comprising the steps of: receiving a communications services event from the communications system; converting the event into a format suitable for the financial bank card network; and transferring the formatted event to the financial bank card network.

Preferably, the communications service event is received in a protocol native to devices in the communication system that provide the communication service. Preferably, the event is converted to a bank card format such as a Visa I, Visa II, ASPDH, or SET format.

In an embodiment, the formatted event corresponds to a pre-authorization and hold request for authorization. Preferably, the method further comprises the step of determining an amount to charge for the communications service corresponding the received communications services event. Preferably, the step of determining the amount to charge for the communications service includes tariffing, taxing, and accumulating of the received communications service events.

Preferably, the method further comprises the steps of: receiving a pre-authorization and hold response from the financial bank card network; and signaling the communications service an indication that the communications service was authorized based on the received pre-authorization and hold response. Preferably, the method further comprises the steps of: receiving a pre-authorization and hold response from the financial bank card network; and signaling the communications service an indication that the communications service was not authorized based on the received pre-authorization and hold response.

In an embodiment, the formatted event corresponds to a forced post request. Preferably, the method further comprises the step of determining an amount to charge for the communications service corresponding the received communications services event. Preferably, the step of determining the amount to charge for the communications service includes tariffing, taxing, and accumulating of the received communications service event.

In an embodiment, the method further comprises the steps of: accumulating a plurality of data structures corresponding to a plurality of received communications service events from the communication system; calculating a discount or surcharge corresponding to the accumulated data structures; and requesting a forced post request over the financial bank card network corresponding to the calculated discount or surcharge. Preferably, the step of calculating the discount or surcharge is performed at the end of a billing cycle determined by elapsed time or event count.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

Figure 1:
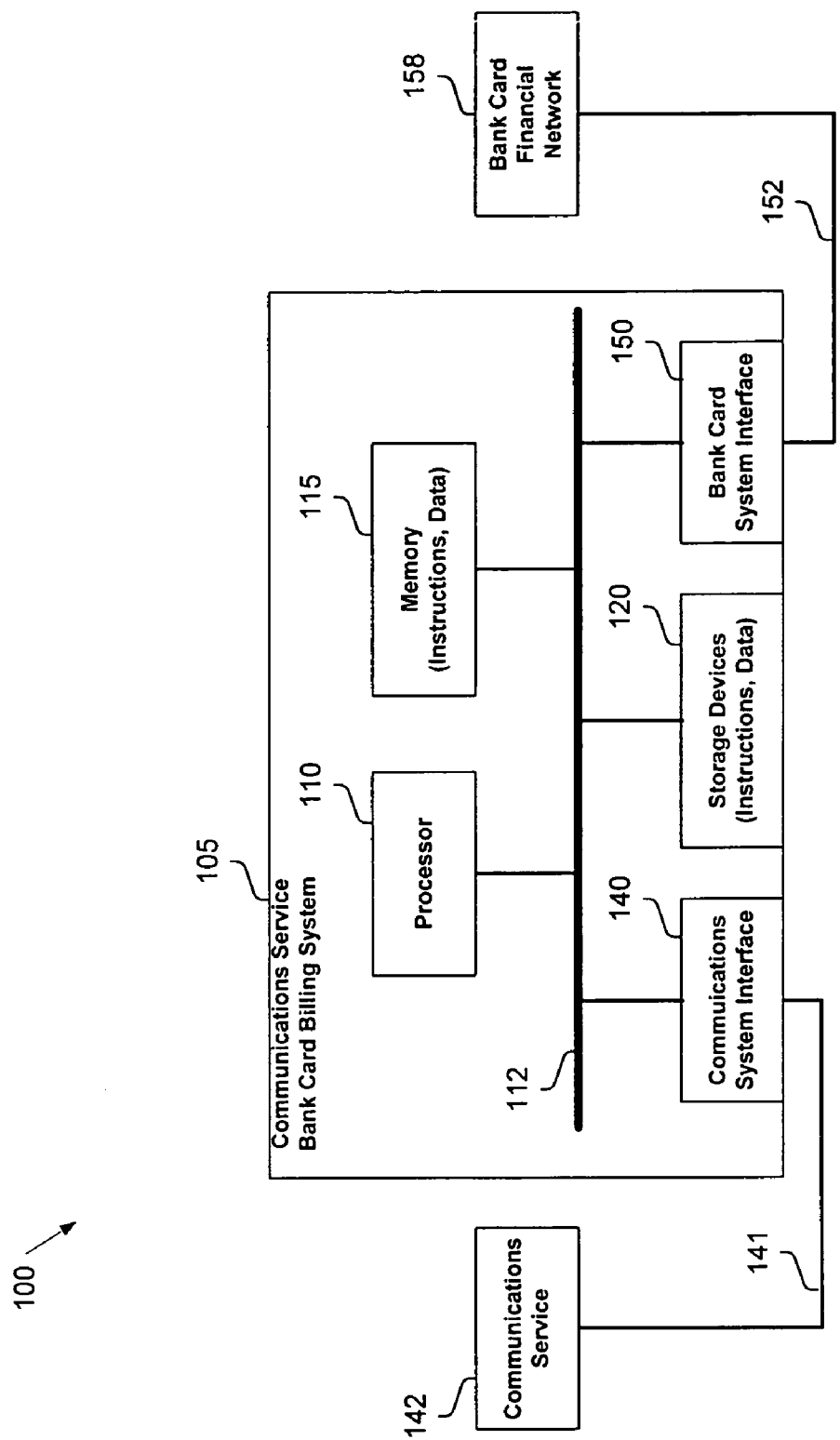
FIG. 1 is a block diagram of an exemplary network environment in which the present invention may be practiced.

FIG. 1 and its discussion herein are intended to provide a description of a general computing environment in which the present invention can be practiced. The present invention is not limited to a single computing environment. Moreover, the architecture and functionality of the present invention as taught herein and would be understood by one skilled in the art is extensible to an unlimited number of computing environments and embodiments in keeping with the scope and spirit of the present invention.

Turning first to FIG. 1, illustrated is an exemplary operating environment 100 for practicing the present invention. Communications service bank card billing system 105 embodies the functionality of the present invention by receiving service requests from communications service 142 over facility 141 which are billed to the customer over bank card financial network 158 over facility 152. Communications service bank card billing system 105 typically comprises a standard computer platform with appropriate communications system interface 140 and bank card system interface 150. Communications service bank card billing system 105 includes a processor 110, memory 115, storage devices 120, communications system interface 140 and bank card system interface 150, which are electrically coupled via bus 112. Memory 115 is one type of computer-readable medium, and typically comprises random access memory (RAM), read only memory (ROM), integrated circuits, and/or other memory components. Memory 115 typically stores computer-executable instructions to be executed by processor 110 and/or data which is manipulated by processor 110. Storage devices 120 are another type of computer-readable medium, and typically comprise disk drives, diskettes, networked services, tape drives, and other storage devices. Storage devices 120 typically store computer-executable instructions to be executed by processor 110 and/or data which is manipulated by processor 110.

Figure 2:
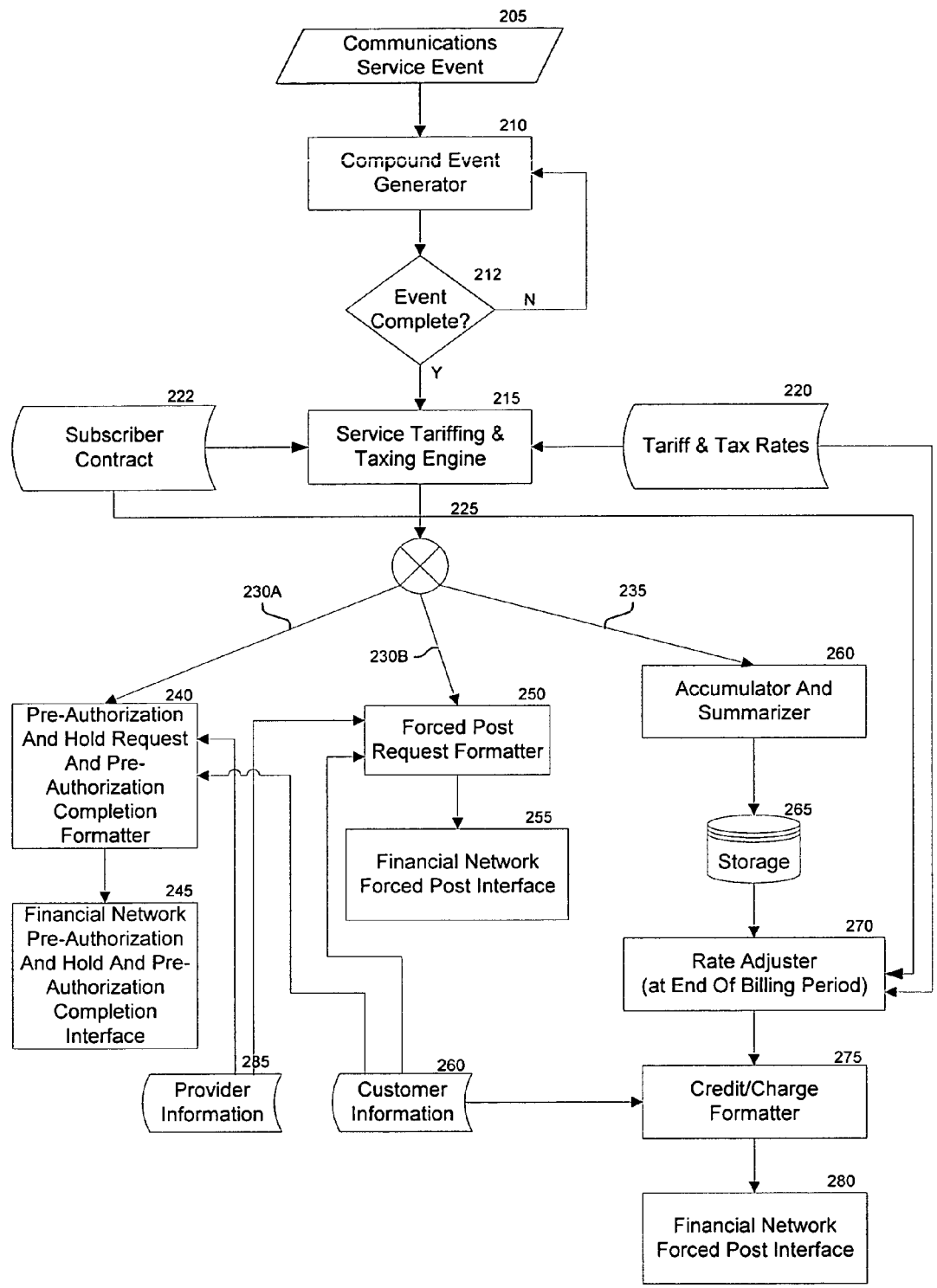
FIG. 2 is a diagram illustrating the flow of data in an embodiment of the present invention.

Turning now to FIG. 2, illustrated is the flow of data in an embodiment of the communications service bank card billing system 105 (FIG. 1). Communications service event 205 represents a communications service event received from a communications service 142. Communications service event 205 could be in a "raw" or native format of the equipment providing the communications service, with surround or other equipment interfacing technology well known in the art used to capture the required information from communications service 142, and to transmit the service authorization or denial to communications service 142, if the service equipment accepts such messages. In other embodiments, the communications service communicates with the communications service bank card billing system 105 using an agreed to or standardized communication protocol.

Compound event generator 210 receives the communications service event and transforms the data 205 as necessary into a known format or "compound event". In step 212, the event is checked for completion. If the event is not complete, the process returns to step 212. If the event is complete, the service tariffing and taxing engine 215 determines the appropriate charges for the requested communications service using one or more tariffing and taxing databases as represented by tariff and tax rates 220. In some embodiments of the invention, the tariff exception are exercised via a subscriber contract database 222. The tariffed and taxed compound event is then duplicated (represented by element 225 and links 230A/B and 235) and processed by the accumulator and summarizer 260, and either pre-authorization and hold request formatter 240 or forced post request formatter 250.

When a service authorization request to the communications service bank card billing service 105 is requested to determine whether the customer has appropriate credit to pay for the desired service, then the data request is processed by the pre-authorization and hold request formatter 240 and then the financial network pre-authorization and hold interface 245. Otherwise, the data request is processed by the forced post request formatter 250 and then the financial network forced post interface 255 to charge the customer's bank card account. Both the pre-authorization and hold request formatter 240 and forced post request formatter 250 use customer information 260 (e.g., a bank card billing number, account name, etc.) and provider information 285 (logical retailer, location, limits, defaults, etc.) in their processing. Bank card message formatters 240 and 250 prepare the bank card message according to well established bank card format (e.g., Visa I, Visa II, ASPDH, SET), which are well known in the bank card processing industry.

In addition, the request is forwarded to the accumulator and summarizer 260 which collects the compound, tariffed, and/or taxed events into a data storage 265. At the end of a billing cycle, these collected events are processed to determine whether an adjustment to the customer's bank card account is required. For example, a customer might be due a volume discount credit, or should be charged an additional service charge for failing to use a predetermined volume level of communications as determined by service contracts and tariff rates. This billing cycle could be determined by a time period (e.g., monthly) or based on the occurrence of some other triggering event (e.g., a number of events threshold reached on a service and/or user basis). To determine and process these credits or additional charges, at the end of the billing period, rate adjuster 270 processes the events accumulated in the storage 265 to determine an aggregate charge rate for the service based on the tariff and tax rates 220 and optionally the subscriber contract database 222. If a credit or surcharge is required, then the credit/charge formatter 275, using customer information 260, prepares the credit or debit request; followed by financial network forced post interface 280 processing the credit/debit request over the financial bank card network 158.

Figure 3:
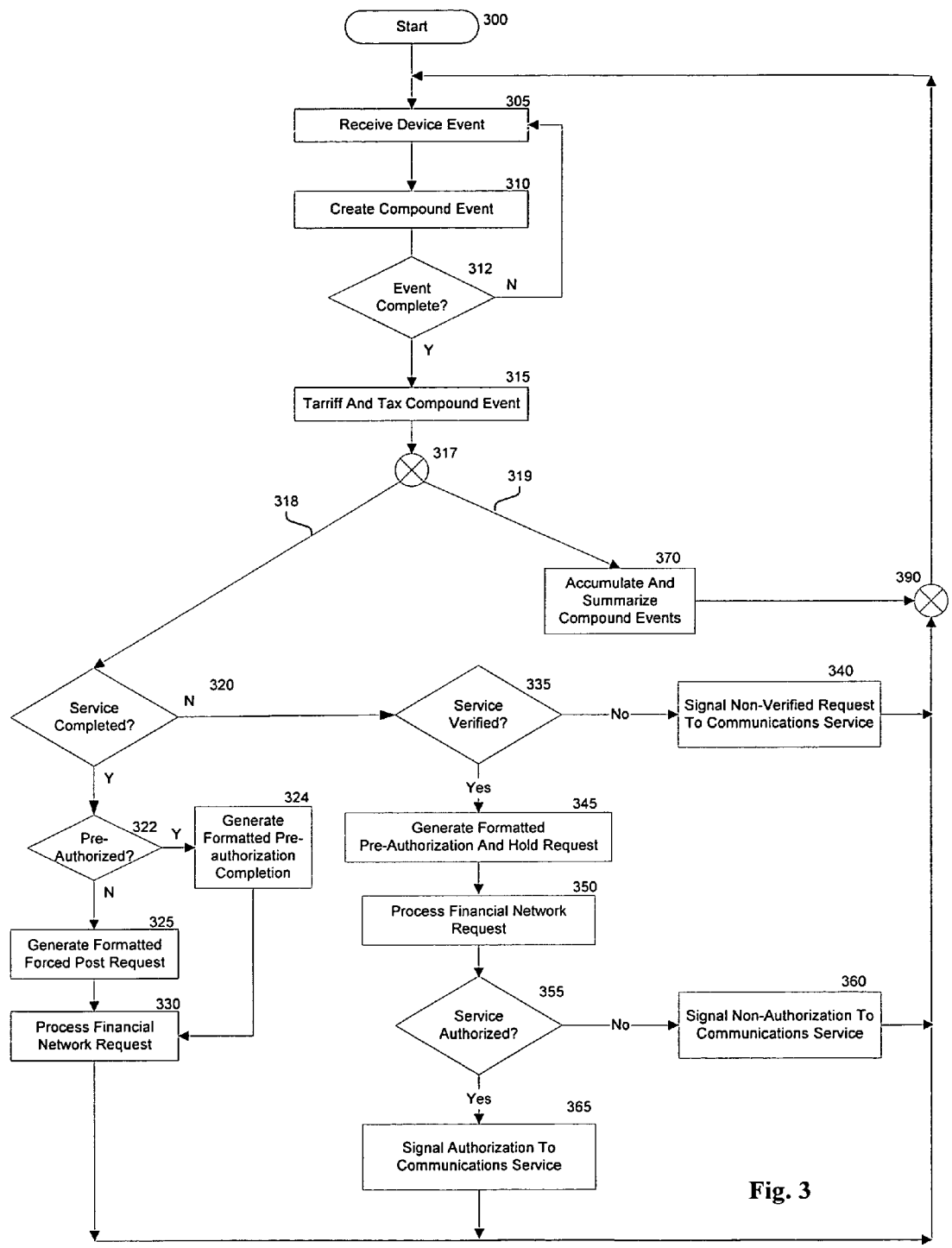
FIGS. 3–4 are flow diagrams illustrating the steps performed in an embodiment of the present invention.

Turning now to FIG. 3, illustrated are the steps performed by communications service and bank card billing system 105 (FIG. 1) in an embodiment of the present invention. Processing begins at step 300 and proceeds to step 305, where an event from a device associated with the communications service is received. Next, in step 310, the received event is transformed, as required, into a compound event having a predetermined format and supplemented with any requisite information. In step 312, the event is checked if complete. If the event is not complete, the processing returns to step 305. If the event is complete, the received or compound event is taxed and tariffed in step 315. The processing of the tariffed and taxed events is then split into two processing paths, which is indicated in FIG. 3 by junction 317, and processing paths 318 and 319.

Turning first to processing path 318, at step 320, the communications service request is evaluated to check if it is associated with a request for new communications service or the completion of a communications service. If the request does not correspond to a completed service request, then the request is checked in step 335 to see whether the service is verified for the requesting customer and all the communication service request information is consistent with a valid service request. If it is not, then step 340 is performed to signal to the equipment providing the service that the service is not authorized. Otherwise, a pre-authorization and hold request is formatted in step 345, and processed over the financial bank card network in step 350. The equipment providing the communications service is then signaled that the service is authorized (step 365) or not authorized (step 360) depending on whether the authorization and hold request is successfully processed as determined in step 355. Otherwise, the communications service request corresponds to a completed service (i.e., the customer should be charged) as determined in step 320, then a forced post request is formatted in step 325 for non pre-authorized events as determined in step 322, and processed over the financial bank card network in step 330. Pre-authorized events are formatted as pre-authorization completions in step 324 and processed over the financial bank card network. The processing of FIG. 3 returns to step 305 to continuously process new communications service requests and events.

Turning now to processing path 319 of FIG. 3, the communications service request (i.e., compound events) is accumulated and summarized in step 370 for processing at the end of a billing period. In an embodiment, the compound events are accumulated and summarized on a per customer account basis. As would be understood by one skilled in the art, numerous different data structures and processing techniques and could be used to accumulate and summarize the requisite information for determining additional charges or credits for a billing cycle in keeping with the scope and spirit of the present invention.

Figure 4:
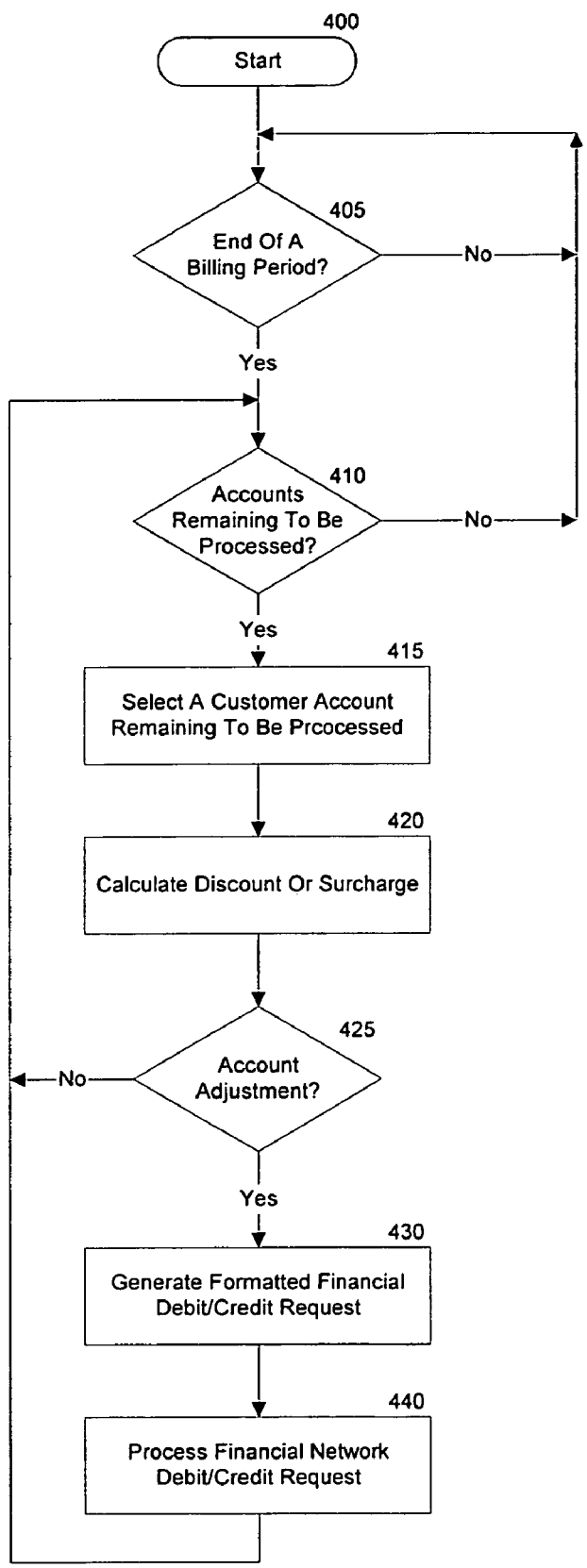

Turning now to FIG. 4, illustrated are the steps performed by communications bank card billing system 105 (FIG. 1) for generating a discount or surcharge based on a given billing period. In an embodiment of the present invention, processing commences with step 400 and loops at step 405 until the end of the billing period or cycle. Then, for each customer account to process for the current billing cycle (step 410), a customer account is selected for processing (step 415), the discount or surcharge is calculated (step 420) for the events accumulated and summarized in step 370 (FIG. 3). If an account adjustment is required as determined in step 425 for the current client, then the credit or debit request is formatted (step 430) and processed over the financial bank card network (440). After all accounts for the current billing cycle have adjusted as required, the processing of FIG. 4 returns to step 405 to wait until the end of a billing cycle has been reached.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

I claim:

1. A method for operating an interface computer system to provide an interface between a financial bank card network and a communications system that provides a communications service to a customer with a customer account in the financial bank card network, the method comprising the steps of:
   receiving a plurality of communications service events from the communications system;
   for each of the plurality of communications service events,
      determining if a communications service event is complete,
      if the communications service event is not complete, then the method includes determining an estimated cost of the communications service event, formatting a pre-authorization and hold request for the estimated cost, and processing the pre-authorization and hold request over the financial bank card network, and
      if the communications service event is complete, then the method includes determining an actual cost of the communications service event, formatting a first forced post request for the actual cost, and processing the first forced post request over the financial bank card network to charge the customer for the communications service event;
   accumulating the plurality of communications service events and associated costs over a billing period for the customer;
   determining whether the customer is due a credit or assessed a surcharge; and
   formatting a second forced post request for the credit or the surcharge, and processing the second forced post request over the financial bank card network.

2. The method of claim 1, wherein determining an estimated cost of the communications service event includes tariffing and taxing the communications service event.

3. The method of claim 1, wherein determining an actual cost of the communications service event includes tariffing and taxing the communications service event.

4. The method of claim 1, wherein in response to processing the pre-authorization and hold request over the financial bank card network, the method further comprises:
   receiving a pre-authorization and hold response from the financial bank card network; and
   signaling the communications service an indication that the communications service was authorized based on the received pre-authorization and hold response.

5. The method of claim 1, wherein in response to processing the pre-authorization and hold request over the financial bank card network, the method further comprises:
   receiving a pre-authorization and hold response from the financial bank card network; and signaling the communications service an indication that the communications service was not authorized based on the received pre-authorization and hold response.

6. The method of claim 1, wherein the communications service events are received in a protocol native to devices in the communication system that provide the communication service.

7. The method of claim 1, further comprising converting the communications service event into a bank card format.

8. The method of claim 7, wherein the bank card format comprises a Visa I, Visa II, ASPDH, or SET format.

9. A computer-readable medium having computer-executable instructions for performing steps for providing an interface between a financial bank card network and a communications system that provides a communications service to a customer with a customer account in the financial bank card network, the steps comprising:
   receiving a plurality of communications service events from the communications system;
   for each of the plurality of communications service events,
      determining if a communications service event is complete,
      if the communications service event is not complete, then the method includes determining an estimated cost of the communications service event, formatting a pre authorization and hold request for the estimated cost, and processing the pre-authorization and hold request over the financial bank card network, and
      if the communications service event is complete, then the method includes determining an actual cost of the communications service event, formatting a first forced post request for the actual cost, and processing the first forced post request over the financial bank card network to charge the customer for the communications service event;
   accumulating the plurality of communications service events and associated costs over a billing period for the customer;
   determining whether the customer is due a credit or assessed a surcharge; and
   formatting a second forced post request for the credit or the surcharge, and processing the second forced post request over the financial bank card network.

10. The computer-readable medium of claim 9, wherein determining an estimated cost of the communications service event includes tariffing and taxing the communications service event.

11. The computer-readable medium of claim 9, wherein determining an actual cost of the communications service event includes tariffing and taxing the communications service event.

12. The computer-readable medium of claim 9, having further computer-executable instructions for performing the steps of:
   receiving a pre-authorization and hold response from the financial bank card network; and
   signaling the communications service an indication that the communications service was authorized based on the received pre-authorization and hold response.

13. The computer-readable medium of claim 9, having further computer-executable instructions for performing the steps of:
   receiving a pre-authorization and hold response from the financial bank card network; and
   signaling the communications service an indication that the communications service was not authorized based on the received pre-authorization and hold response.

14. The computer-readable medium of claim 9, wherein the communications service events are received in a protocol native to devices in the communication system that provide the communication service.

15. The computer-readable medium of claim 9, having further computer-executable instructions for performing the step of converting the communications service event into a bank card format.

16. The computer-readable medium of claim 15, wherein the bank card format comprises a Visa I, Visa II, ASPDH, or SET format.

* * * * *